Feb. 3, 1970 H. P. HINTZ ET AL 3,493,302
AUTOMATIC PHOTOCOPYING APPARATUS
Filed April 25, 1967 2 Sheets-Sheet 1

HARVEY P. HINTZ
JOHN F. EGAN
INVENTORS
BY Daniel E. Sragow
Robert W Hampton
ATTORNEYS

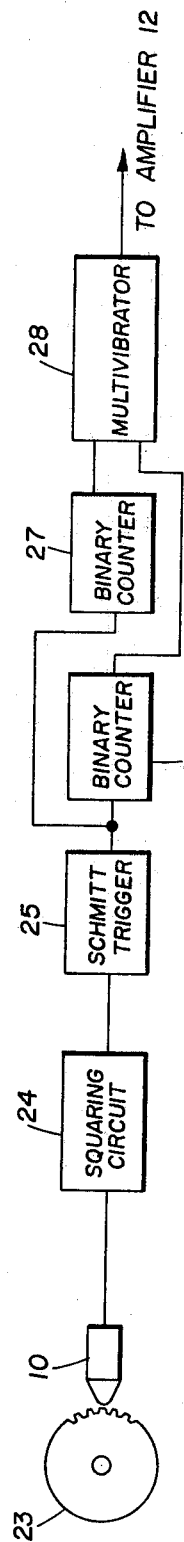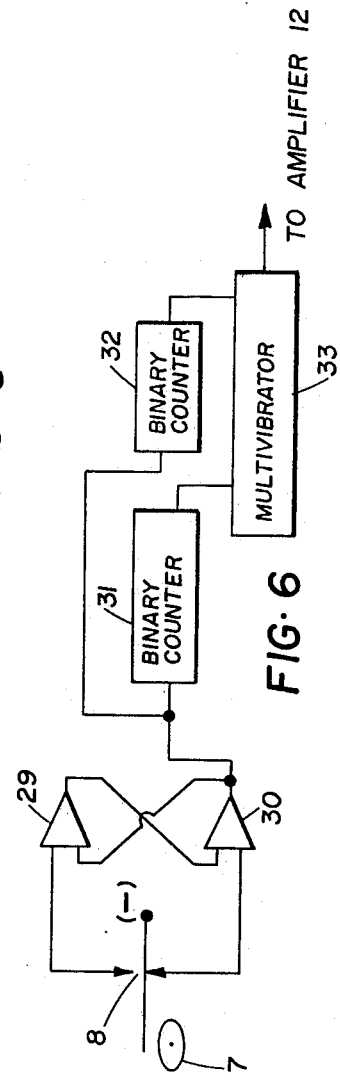
HARVEY P. HINTZ
JOHN F. EGAN
INVENTORS
BY Daniel E. Dragon
Robert W Hampton
ATTORNEYS

United States Patent Office 3,493,302
Patented Feb. 3, 1970

---

3,493,302
AUTOMATIC PHOTOCOPYING APPARATUS
Harvey P. Hintz and John Francis Egan, Rochester, N.Y., assignors to Eastman Kodak Company, Rochester, N.Y., a corporation of New Jersey
Filed Apr. 25, 1967, Ser. No. 633,549
Int. Cl. G03b 27/32
U.S. Cl. 355—64             12 Claims

ABSTRACT OF THE DISCLOSURE

A system is provided for producing photographic copies of original documents where it is desired to have the photographic copies in a strip of a standard length and having a certain area of the photographic copy being blank for leader purposes. The invention features a unique control system for recording a given number of document images onto the strip and then continuing to operate a strip drive mechanism without exposing the strip to further documents to provide a blank portion of the strip as a leader.

CROSS-REFERENCES TO RELATED APPLICATIONS

Reference is made to commonly assigned copending U.S. patent application Ser. No. 486,725 entitled "Strip Retrieval Device," filed in the name of Schneeberger and Seaberg on Sept. 13, 1965, now refiled as a continuing application Ser. No. 708,419, filed Feb. 26, 1968; and to commonly assigned copending U.S. patent application Ser. No. 633,522 entitled "Squaring Circuit," filed in the name of Nelson on Apr. 25, 1967.

BACKGROUND OF THE INVENTION

Field of the invention

The present invention relates to photographic copying apparatus and more particularly to a system for producing photographic copies on strips of film of uniform length and having a uniform blank area to serve as a leader. This type of photographic copy is used in a strip type of reader such as disclosed in the above-identified copending U.S. patent application filed in the name of Schneeberger and Seaberg.

Description of prior art

In producing the strips, it is desirable that the blank areas be produced at the same time that the photographing is taking place so as to eliminate the need for splicing a leader onto the film. It is also desirable that each document which is copied take a uniform amount of space on the photographic record to facilitate indexing and retrieval of the copied documents.

It is therefore an object of the invention to provide a system which regulates the flow of documents through the copier and at the same time, regulates the exposure and advance of the photographic medium in order to provide a uform frame length, a uniform strip length, and a uniform length of unexposed photographic material to serve as a leader.

SUMMARY OF THE INVENTION

These other objects are accomplished in accordance with teachings of this invention by providing apparatus for recording images derived from a plurality of documents onto successive portions of a filmstrip. Such apparatus includes a document exposure station, a mechanism for directing documents one at a time past the exposure station, a mechanism for moving successive portions of the strip to receive the images from the documents, a sensing device providing a signal or manifestation of a predetermined number of documents being fed to the exposure station, and control means for inhibiting the directing of documents past the exposure station and for moving a predetermined length of the sensitive strip past the exposure station without exposure.

BRIEF DESCRIPTION OF THE DRAWINGS

These and other objects of the invention will be apparent to those skilled in the art by the description which follows. Reference is now made to the accompanying drawing wherein:

FIG. 4 is a block diagram showing the path of the documents being copied as they go from their stack, waiting to be copied, through the feeder to the exposure station where they are photographed and then discharged from the machine.

FIG. 5 is a block diagram of the frame length control.
FIG. 6 is a block diagram of the strip length control.

DESCRIPTION OF THE PREFERRED EMBODIMENTS

Figure 3:
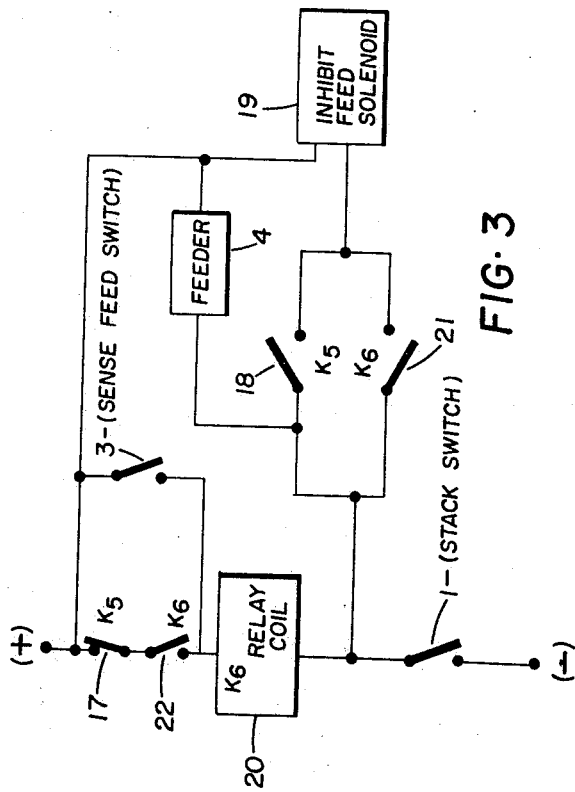
FIG. 3 is a block diagram of the controls for the document feeding arrangement.

Referring to FIG. 4, there is shown a block diagram of the flow of the documents through the copier. When documents are placed in the machine to be copied, the stack of documents actuates a stack switch 1 which turns on feeder 4. The document is then fed onto a conveyer belt 2 which carries the document the remainder of the way through the copier. When the leading edge of the document leaves feeder 4, it contacts the sense-feed switch 3, which turns off feeder 4 to prevent another document from being fed. The document which has been fed is then conveyed to the exposure station 5 which then photographs the document. Immediately before entering exposure station 5, the document actuates trip switch 6 which starts the film drive and remains actuated as long as the document is within the exposure station 5. The film drive moves in synchronism with conveyer 2 so that the document to be copied is accurately registered with the film and makes a good copy thereon.

Figure 1:
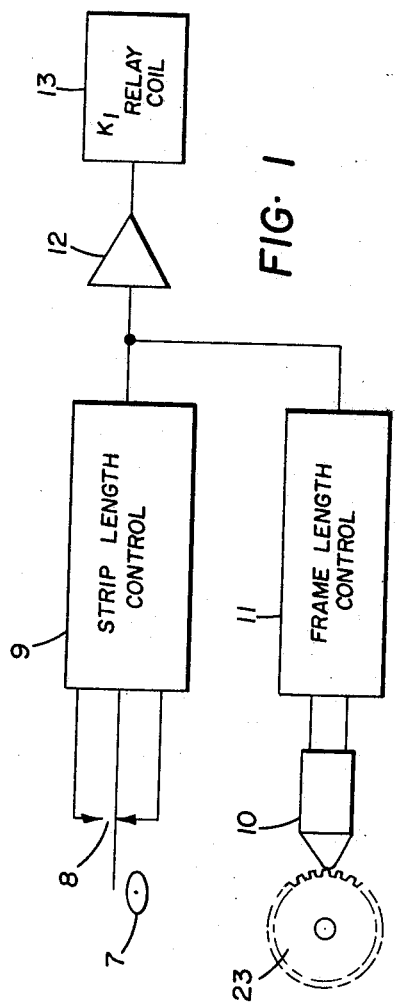
FIG. 1 shows a block diagram of the strip length control and frame length control as they are connected together to control the film drive.

Referring to FIG. 1, there is shown a cam 7 which is mounted on the film drive and which actuates a single-pole, double-throw switch 8 which controls the strip length control 9. The strip length control 9, to be hereinafter described, limits the number of frames on the strip of film and then regulates the amount of blank film to be added without any exposure in order to provide a leader. Magneaic pickup 10 derives pulses from a toothed wheel which is also mounted on the film drive mechanism. This magnetic pickup feeds a signal to frame length control 11, which is hereinafter to be described. Frame length control 11 is set so that it measures out a length of film equal to the amount needed for the longest document to be copied. When a shorter document is copied, it continues to advance the film drive so that the remainder of the frame is filled with blank film. Both strip length control 9 and frame length control 11 have their outputs fed through amplifier 12 to $K_1$ relay coil 13, whose function will hereinafter be described.

Figure 2:
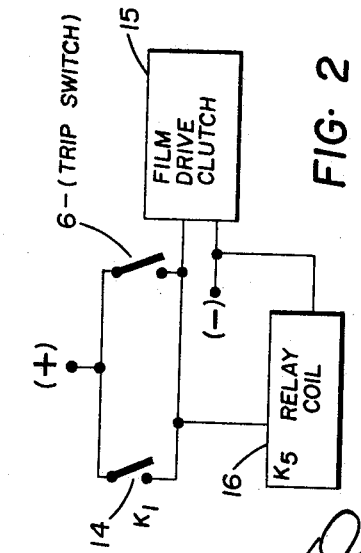
FIG. 2 is a block diagram of the document trip switch as it controls the film drive.

Referring to FIG. 2, there is shown the switch contact 14 of $K_1$ relay coil 13 and trip switch 6 connected in parallel. Either $K_1$ contact 14 or trip switch 6 can actuate the film drive clutch 15, thus starting the film drive. It can therefore be seen that the film is driven immediately before the document enters the exposure station 5 and as the document is passing through the exposure station 5, or when either the strip length control 9 or the frame length control 11 has caused $K_1$ relay coil 13 to energize $K_1$ contact 14. It is to be further noted in FIG. 2 that, whenever the film drive clutch 15 is energized, the $K_5$ relay coil 16 is also energized.

Referring to FIG. 3, it is to be noted that the contact 17 of $K_5$ relay coil is normally closed, whereas the contact 18 of $K_5$ relay coil is normally opened. When the film drive clutch 15 is energized, the $K_5$ relay coil 16 is also energized as described above. When $K_5$ relay coil 16 is energized, contact 17 is opened which therefore eliminates any power to $K_6$ relay coil 20. Solenoid 19 functions to stop the feeding of more documents. After the document goes through the feeder 4, however, the document actuates sense feed switch 3, shown in both FIG. 3 and FIG. 4, which energizes $K_6$ relay coil 20. Since the stack switch 1 has been closed as soon as any documents are placed in the hopper to be copied, the energization of $K_6$ relay coil 20 closes $K_6$ switch contact 21, which energizes the inhibit feed solenoid 19 which therefore stops the feeder. It can therefore be seen that only one document can be fed at a time since the feeder is inhibited as soon as a document comes out of it and actuates sense feed switch 3.

When the sense feed switch 3 is actuated, it energizes $K_6$ relay coil 20 which closes $K_6$ switch contact 22. This arrangement allows the sense feed switch 3 to open after the document has passed it, while still maintaining the inhibit feed solenoid 19 energized since the $K_6$ relay coil 20 will remain energized as long as $K_5$ contact 17 and stack switch 1 remain closed.

Shown in FIG. 5 is a more detailed block diagram of the frame length control 11. Toothed wheel or gear 23 is mounted on the same shaft as is the film drive. Whenever the film is being driven, the toothed wheel 23 rotates. Magnetic pickup 10 detects the teeth as they revolve and feeds pulses to squaring circuit 24. Squaring circuit 24 can be any of a number of devices which process a signal to produce rectangular waves. It has been found that the preferred squaring circuit is a double-transistor squaring circuit which is described in more detail in an application of R. L. Nelson, filed concurrently herewith entitled "Squaring Circuit" Ser. No. 633,522. The rectangular wave which is the output of squaring circuit 24 is fed to a Schmitt trigger 25 which gives rectangular pulses of alternate polarity. These pulses are then fed to binary counter 26 which produces a pulse after a length of film has passed which corresponds to the minimum length of document which is to be copied. This pulse causes multivibrator 28 to turn on and thus to energize amplifier 12. Binary counter 27 produces a pulse when a length of film has passed corresponding to a full frame. The pulse from counter 27 switches multivibrator 28 to its opposite state to de-energize amplifier 12.

Referring to FIG. 6, cam 7 is mounted on the film drive. It actuates a single-pole, double-throw switch 8. Amplifiers 29 and 30 are connected as a multivibrator. Switch 8 is connected to amplifiers 29 and 30 in such a way that it is necessary for the switch arm to actually make contact in order for the multivibrator to switch. This arrangement is provided in order to prevent spurious switching if the shaft happens to stop while the switch arm is on the ramp of the cam. The output of amplifier 30 is fed to binary counters 31 and 32. Counter 31 produces a pulse when the required length of exposure has been made on the film. This pulse switches the multivibrator 33 so that amplifier 12 energizes $K_1$ relay coil 13. Counter 32 produces a pulse when the proper strip length has passed. At this point, the state of the multivibrator is reversed and amplifier 12 de-energized.

From the above it can be readily appreciated that apparatus has been described for automatically producing a film strip which has photographic copies of uniform frame length, which has a predetermined exposed length, and a predetermined unexposed leader length.

While the invention has been described with respect to a particular embodiment, it will be readily appreciated by those skilled in the art that modifications and changes can be made without departing from the scope of the invention. The invention should therefore be limited only to a scope defined by the appended claims.

We claim:
1. A copying apparatus for copying individual documents onto a strip of material comprising:
  (a) a stack switch for sensing the presence of documents waiting to be copied, and being adapated to control said apparatus,
  (b) a feeder for feeding documents into the copier,
  (c) a sense feed switch which senses the document to be copied after it comes out of the feeder, said sense feed switch being adapted to turn off said feeder,
  (d) an exposure station for exposing said strip material to a document,
  (e) a conveyor for conveying the document from said feeder to said exposure station;
  (f) a trip switch, said trip switch being adapted to control the movement of the strip of material and being adapted to initiate movement of the stirps of material when said trip switch is operated, said trip switch being further adapted to be actuated as long as the document is in said exposure station,
  (g) a strip length control, said strip length control comprising a counter which regulates the length of the strip of material,
  (h) means for stopping the feeding of documents in response to a signal from said counter when said strip has reached a predetermined length,
  (i) frame length control means, said frame length control means being responsive to the amount of strip material passing during exposure and being adapted to cause additional material to pass during each exposure so that each frame length will be uniform, and
  (j) feeder control means for inhibiting the feeding of documents during those times when additional strip material is being advanced.

2. Apparatus for recording images of a plurality of documents respectively onto successive portions of a strip of sensitive material, said apparatus including:
  (a) an exposure station;
  (b) means for feeding the documents to and through said exposure station;
  (c) strip driving means for moving the strip of sensitive material with respect to said exposure station to position successive portions of the strip to receive an image of a document; and
  (d) control means for measuring the number of documents recorded onto the sensitive material and for controlling said means for feeding and said strip driving means, said control means being coupled to said means for feeding and to said strip driving means for deactivating said means for feeding after a given number of documents have been recorded upon the strip of sensitive material and for continuing to operate thereafter said strip driving means until a given length of the sensitive material is directed past said exposure station without exposure to the images of other documents.

3. Apparatus for photographically recording images of a plurality of documents onto a strip of sensitive material, said apparatus including:
  (a) an exposure station;
  (b) means for feeding the documents through said exposure station;

(c) strip driving means for moving the strip of sensitive material through said exposure station so that the images of the documents will be photographically recorded onto successive portions of the strip of sensitive material; and (d) control means for regulating the number of images recorded onto the strip of sensitive material and for providing a given length of the strip of sensitive material unexposed to images of documents, said control means including means coupled to said strip driving means for providing that the successive portions of the strip of sensitive material are of substantially uniform length, means coupled to said strip driving means for sensing the number of successive portions of the sensitive material moved by said strips driving means past said exposure station determined number of successive portions have been and for deactivating said driving means after a preexposed to the images of documents, and means for continuing to operate said strip driving means after the deactivation of said means for feeding to provide a predetermined length of the strip of sensitive material unexposed to document images.

4. Apparatus for photographically recording images of a plurality of documents onto a strip of sensitive material, said apparatus including:

(a) an exposure station;

(b) feeding means operable in a first state to direct the the documents one at a time past said exposure station and in a second state to inhibit the movement of the documents to said exposure station;

(c) strip driving means for moving the strip of sensitive material with respect to said exposure station so that images of the documents will be respectively photographically recorded onto successive portions of the strip of sensitive material;

(d) first control means connected to said feeding means and said strip driving means and responsive to the feeding of documents by said means for controlling movement of portions of the sensitive material of a preselected length past said exposure station and thereafter disposing said feeding means in said second state; and (e) second control means coupled to said means for feeding and to said strip driving means for measuring the number of portions exposed to the images of documents, said second control means including means for disposing said feeding means in said second state after a predetermined number of portions of the strip of sensitive material have been exposed to the images of documents and means controlling said strip driving means thereafter to direct past said exposure station a given length of the strip of sensitive material without exposure to the images of documents.

5. Apparatus as claimed in claim 4, wherein said first control means operates said strip drive means to insure the substantially uniform length of the successive portions of the strip of sensitive material.

6. Apparatus as claimed in claim 4, wherein said first control means includes sensing means for detecting the movement imparted to the strip of sensitive material by said strip driving means to provide a pulse per unit of movement imparted to the strip of sensitive material, first counting means sensitive to the pulses of said sensing means to provide a first signal after a first number of the pulses have been applied thereto, second counting means responsive to the pulses of said sensing means to provide a second signal after a second number of the pulses have been applied thereto, and means responsive to said first signal to initiate the operation of said strip driving means and sensitive to said second signal to discontinue the operation of said strip driving means.

7. Apparatus as claimed in claim 4, wherein said second control means includes sensing means for generating a plurality of pulses, each of the pulses indicating the unit length movement of the strip of sensitive material, first counting means providing a first signal when a first number of pulses have been applied thereto by said sensing means, second counting means responsive to said sensing means to provide a second signal when a second number of signals have been applied thereto, and logic means responsive to said first signal to initiate the operation of said strip driving means and responsive to said second signal to discontinue the operation of said strip driving means.

8. Apparatus as claimed in claim 7, wherein said first number is selected to provide a first length of the strip of sensitive material that has been exposed to the images of documents, and the second number is selected to provide an additional second length of the strip material that is unexposed to images of documents.

9. Apparatus for photographically recording images of a plurality of documents into a strip of sensitive material, said apparatus comprising:

(a) an exposure station;

(b) first means for directing the documents along a path through said exposure station;

(c) second means operable in a first state to feed a document onto said path and operable in a second state to inhibit the feeding of the document onto said path;

(d) strip driving means for moving the strip of sensitive material with respect to said exposure station for sequentially recording the images of the documents respectively onto successive portions of the strip of sensitive material;

(e) document sensing means disposed with respect to said path for detecting the passage of documents along said path and for disposing said second means in said second state in response to the passage of a document; and (f) control means responsive to the passage of a first length of the strip of sensitive material to dispose said second means in said second state and to operate said strip driving means to move the strip of sensitive material, said control means being responsive to the passage of a second length of the strip of sensitive material to discontinue the operation of said strip driving means, said second length being greater than said first length.

10. Apparatus as claimed in claim 9, wherein said control means includes strip sensing means for detecting the passage of the strip of sensitive material to generate a pulse for the passage of a unit length of the strip of the sensitive material, first counting means sensitive to the application of a first number of the pulses to provide a first signal, second counting means sensitive to the application of a second number of the pulses to generate a second signal, said second number being greater than said first number by a predetermined amount, and logic means responsive to said first signal to initiate the operation of said strip driving means to move the strip sensitive material, said logic means responsive to said second signal to discontinue the operation of said strip driving means.

11. Apparatus as claimed in claim 10 wherein said control means includes strip length control means responsive to the passage of the strip of sensitive material for maintaining said second means in said state to permit the passage of a portion of the strip material of substantially uniform length before disposing said second means in said first state.

12. Apparatus for recording a plurality of document images onto successive portions of a strip of sensitive material, said apparatus comprising:

(a) a document exposure station;

(b) means for directing documents one at a time past said exposure station;

(c) means for moving successive portions of the strip into a recording position to receive the image of a document at said exposure station;

(d) means for sensing a predetermined number of documents directed past said exposure station to provide a manifestation thereof; and (e) control means, coupled to said means for directing and to said means for moving and responsive to the manifestation of said means for sensing, for inhibiting the directing of documents past said exposure station by said means for directing and actuating said means for moving to move a predetermined length of the strip past said document recording position.

References Cited

UNITED STATES PATENTS

| | | | |
|---|---|---|---|
| 3,115,057 | 12/1963 | Lemche | 355—64 X |
| 3,253,503 | 5/1966 | Hayden et al. | 355—64 X |

NORTON ANSHER, Primary Examiner

R. A. WINTERCORN, Assistant Examiner

U.S. Cl. X.R.

355—48, 50